UNITED STATES PATENT OFFICE.

FRANKLIN LA REW, OF HAMILTON, OHIO.

IMPROVEMENT IN HOG-CHOLERA MEDICINES.

Specification forming part of Letters Patent No. 38,169, dated April 14, 1863.

*To all whom it may concern:*

Be it known that I, FRANKLIN LA REW, of Hamilton, Butler county, and State of Ohio, have discovered a new and useful medicine which operates as a preventive and remedy for a generally-prevailing disease among swine, known as "hog-cholera;" and I do hereby declare that the following is a full and exact description thereof and the mode of using the same.

My discovery or invention is the result of a long course of experiments in the treatment of diseases to which swine are subject, and especially that disease so generally destructive of the life of this animal—viz., "hog-cholera"—which has swept off in its ravages within a few years thousands, resulting in a loss to the country of probably more than a million of dollars.

My new medicine for the purposes stated consists in the combination of the following ingredients, viz: one-half pound Spanish brown, one-half pound copperas, one-half pound niter, two pounds salt, one-half pound alum, one-half-gallon fish-brine, one dozen red-peppers, one pound poke-root, three pints hickory-ashes, one pound sulphur, two pounds charcoal.

The peppers, poke-root, and sulphur must be boiled with the hickory-ashes until the strength is extracted in, say, three gallons of water, when this decoction will be mixed with the other ingredients (the charcoal being pulverized) above enumerated in forty gallons of soap-suds made by the dissolution of half a pound of common hard soap. After the mixture has been made forty-eight hours, it will be ready for use, after thoroughly stirring with suitable means to agitate the entire mass.

When the hog-cholera is prevailing in any part of the country the mixture may be given (as a preventive) to swine, in their food, three or four times each week. One quart for one animal will be sufficient for each feed in which the mixture is given. About four quarts per week for each hog will have the effect necessary to prevent the animal taking the disease.

When the hog is first taken with the hog-cholera, and before it refuses to eat, a larger quantity of the mixture should be given every day—viz., three pints per day each day as long as the animal can be induced to eat the mixture with its food.

Having fully described my new medicine and the manner of compounding and using the same, what I claim, and desire to secure by Letters Patent, is—

The combined use of the above-named ingredients, when prepared and used in the manner and for the purpose specified.

In testimony whereof I have hereunto signed my name before two subscribing witnesses.

FRANKLIN x LA REW.
(his mark.)

Witnesses:
S. CRANE,
L. SMITH.